United States Patent Office 3,567,670
Patented Mar. 2, 1971

3,567,670
COMPOSITIONS OF ABS COPOLYMERS CONTAINING MONOALKYL ETHERS OF TRIPROPYLENEGLYCOL
Floyd B. Nagle, Midland, Mich., assignor to The Dow Chemical Company, Midland, Mich.
No Drawing. Filed Dec. 29, 1967, Ser. No. 694,419
Int. Cl. C08c 11/28, 11/32
U.S. Cl. 260—33.2
4 Claims

ABSTRACT OF THE DISCLOSURE

Compositions comprising ABS copolymers, i.e. acrylonitrile, styrene, butadiene rubber interpolymers, having intimately incorporated therewith from 0.5 to 2 percent by weight of a monoalkyl ether of tripropylene glycol having the general formula $$HO—(C_3H_6O)_3—R$$

wherein R is an alkyl radical having from one to four carbon atoms.

---

This invention relates to compositions of ABS copolymers adapted for molding by compression, injection and extrusion techniques and pertains especially to compositions having improved processing characteristics.

U.S. Pat. No. 3,220,917 describes spinning solutions comprising acrylonitrile polymer and certain polyoxyalkylene glycols to provide fibers and films having increased flexibility.

Canada Pat. No. 751,976 describes compositions comprising styrene polymers containing thermoplastic polyhydroxyethers to make films having low coefficients of friction.

Great Britain Pat. No. 1,074,373 describes compositions of styrene, acrylonitrile graft copolymers upon a rubber substrate modified with polyethylene glycols having an average molecular weight of at least 6500 to form products having improved toughness.

It has now been discovered that ABS polymers can readily be shaped by compression, injection or extrusion procedures and at substantially greater rates of extrusion by incorporating with the polymer a small but effective amount, e.g., from about 0.5 to 2 percent by weight, of a monoalkyl ether of tripropylene glycol having the general formula $$HO—(C_3H_6O)_3—R$$

wherein R is an alkyl radical having from one to four carbon atoms.

Among suitable monoalkyl ethers of tripropylene glycol are the methyl, ethyl, propyl, isopropyl, butyl, sec-butyl, and isobutyl, ethers of tripropylene glycol.

The term "ABS Copolymer" employed herein has the usual meaning in the art of denoting a styrene, acrylonitrile rubber copolymer or interpolymer having good impact strength and resistance to solvents. More specifically, the invention is concerned with ABS copolymers of (A) from about 15 to 35 weight percent acrylonitrile, (B) from about 60 to 80 weight percent vinyl aromatic hydrocarbon, e.g. styrene, and (C) from about 5 to 20 weight percent natural or a synthetic rubber, and preferably a synthetic stereospecific homopolymer of butadiene, copolymer of butadiene and styrene, or a block copolymer of butadiene and styrene. Stereospecific rubbery polymers of butadiene, or butadiene and styrene, and methods of making the same are described in U.S. Pats. Nos. 3,178,402; 3,317,918 and 3,356,763.

The monoalkyl ether of tripropylene glycol can be incorporated with the ABS copolymer in any usual way such as by blending granules of the polymer with the desired amount or proportion of the monoalkyl ether in a tumbling blender or ribbon blender such that the ether is uniformly or substantially uniformly coated onto the polymer granules. Such coated, or blends of, polymer granules are adapted for extruding or injection molding procedures to form shaped articles. The ingredients can be intimately incorporated with one another by blending on compounding rolls or in a Banbury mixer at elevated temperatures which soften, heat-plastify or melt the polymer, after which the composition is cooled or allowed to cool to room temperature or thereabout and is cut or ground to a granular form suitable for molding. In a preferred practice the monoalkyl ether of tripropylene glycol is blended with the ABS polymer in granular form.

The following examples illustrate ways in which the principle of the invention has been applied, but are not to be construed as limiting its scope.

EXAMPLE 1

A granular ABS polymer consisting of 17 percent by weight acrylonitrile, 6 percent polybutadiene (a stereospecific homopolymer having about 32 percent cis 1,4-, about 60 percent trans 1,4- and about 8 percent 1,2-structure) and having a Mooney number ML(1+4) of 55, and about 75 percent styrene, which polymer contained 1 percent white mineral oil, 1 percent tri(nonylphenyl) phosphite and 0.25 percent 2,6-di-tert.-butyl-4-methylphenol, was mixed with 1 percent by weight of monomethyl ether of tripropylene glycol. The resulting mixture was fed to a 1.5 inch diameter screw type plastics extruder wherein it was pressed and heated at temperatures between 425° F. at the feed end, and 400° F. at the extrusion die end, while rotating the screw at a constant speed of 84 revolutions per minute. The rate of feed of the material to the plastics extruder was adjusted to be just below the rate that caused surging of the extrudate. The material was extruded as a strand 0.125 inch in diameter. It cooled and was cut to a granular form. A melt flow rate for the composition was determined by procedure described in A.S.T.M. D1238-65T. The flow rate for the composition FR–G was 9.565 grams.

The flow rate FR–G of polymer without any added agent was 7.469 grams.

EXAMPLE 2

A granular ABS polymer similar to that employed in Example 1 was mixed with 1 percent by weight of monomethyl ether of tripropylene glycol. The mixture was fed to a 1.5 inch diameter screw type plastics extruder wherein it was pressed, heated to a temperature of 230° C. and was extruded through a ⅛-inch diameter orifice, and the melt index for the composition determined. The flow rate FR–G for the composition was 9.1260. The flow rate for the polymer without the monomethyl ether of tripropylene glycol was 7.7395.

Similar results are obtained when the monoethyl, monopropyl, monoisopropyl, mono-sec-butyl, mono-iso-butyl, or mono-n-butyl ethers of tripropylene glycol are employed in place of the mono-methyl ether of tripropylene glycol used in the examples.

I claim:
1. A composition comprising an ABS copolymer consisting essentially of (A) from about 15–35 percent by weight acrylonitrile, (B) from about 60–80 percent of a monovinyl aromatic hydrocarbon, (C) from about 5 to 20 percent of a rubbery homopolymer of butadiene, or a copolymer of butadiene and styrene, or a block copolymer of butadiene and styrene, and intimately incorporated therewith from 0.5 to 2 percent by weight of a monoalkyl ether of tripropylene glycol having the general formula $$HO-(C_3H_6O)_3-R$$

wherein R is an alkyl radical having from 1 to 4 carbon atoms.

2. A composition as claimed in claim 1 wherein the monoalkyl ether is monomethyl ether of tripropylene glycol.

3. A composition as claimed in claim 1 wherein the monovinyl aromatic hydrocarbon is styrene.

4. A composition as claimed in claim 1, wherein the ABS copolymer consists essentially of about 17 percent acrylonitrile, about 6 percent polybutadiene and about 75 percent styrene, in chemically combined form.

References Cited

UNITED STATES PATENTS

| | | | |
|---|---|---|---|
| 3,206,420 | 9/1965 | Smart et al. | 260—33.2 |
| 3,220,917 | 11/1965 | Lowes | 260—33.2 |
| 3,249,569 | 5/1966 | Fantl | 260—33.2 |
| 3,450,794 | 6/1969 | Ebmeth et al. | 260—33.2 |

MORRIS LIEBMAN, Primary Examiner

H. H. FLETCHER, Assistant Examiner

U.S. Cl. X.R.

260—33.4